United States Patent [19]
Ruckel

[11] 3,979,371
[45] Sept. 7, 1976

[54] POLYMERIC LIMONENE EPOXIDE AND PROCESS FOR PREPARING THE SAME

[75] Inventor: Erwin Richard Ruckel, Darien, Conn.

[73] Assignee: Arizona Chemical Company, Wayne, N.J.

[22] Filed: Jan. 24, 1975

[21] Appl. No.: 543,761

[52] U.S. Cl. .......................... 526/273; 260/830 R; 260/836; 428/355; 526/233; 526/237
[51] Int. Cl.² ...................................... C08F 124/00
[58] Field of Search ...................... 260/88.3 A, 93.3

[56] References Cited
UNITED STATES PATENTS

| | | | |
|---|---|---|---|
| 2,368,767 | 2/1945 | Moore | 260/93.3 |
| 3,130,207 | 4/1964 | Greenspan et al. | 260/348.5 |

OTHER PUBLICATIONS

Rizzo et al., FMC Technical Bulletin, No. 2, Reprinted from Mar. 1960 of Modern Plastics.

*Primary Examiner*—Harry Wong, Jr.
*Attorney, Agent, or Firm*—Harry H. Kline

[57] ABSTRACT

There is provided limonene epoxide polymer prepared by polymerizing monomeric limonene epoxide dissolved in an inert polar solvent at a temperature ranging from between about −20°C. and about −150°C. in the presence of an inorganic, non-metallic, fluoride catalyst, such as boron trifluoride and phosphorous pentafluoride, to obtain an optically active polymer, useful as a tackifier in an adhesive composition for rubbers or elastomers.

6 Claims, No Drawings

POLYMERIC LIMONENE EPOXIDE AND PROCESS FOR PREPARING THE SAME

The present invention relates to a process for preparing a polymeric terpene oxide and to a novel homopolymer so prepared. More particularly, it relates to the low temperature polymerization of limonene epoxide in the presence of an inorganic, non-metallic, Lewis acid, fluoride catalyst. Still more particularly, it relates to the polymerization of limonene epoxide utilizing low temperature, Lewis acid catalytic techniques in the presence of an inert polar solvent to obtain the corresponding polymer useful as a tackifier for rubbers when blended therewith.

In the past, attempts have been made to polymerize terpene epoxides. Unfortunately, none of the processes used to affect polymerizable monomers can be satisfactorily applied to terpene epoxides. Thus, for instance, in contacting a terpene, such as $\alpha$-pinene epoxide, with a Lewis acid, rearranged monomers, rather than polymers result. Consequently, terpene polymers having polarity that are compatible with rubbers or elastomers cannot be readily formed in good yield. If a terpene epoxide polymer could be formed, both such polymeric material as well as the method for preparing the same would fulfill a need long recognized in the art.

It is, therefore, a principal object of the invention to prepare a polar terpene resin in which the terpene mer is interconnected with an oxygen atom. It is a further object of the invention to provide a process for polymerizing a terpene oxide with a Lewis acid catalyst to obtain a polar polymer useful as a tackifier for rubbers and elastomers. Other objects and advantages will become apparent from a reading of the ensuing description.

To these ends, it has been found that limonene epoxide can be readily polymerized in good yield in a straightforward manner. Limonene epoxide, admixed with an inert polar solvent, is subjected to the action of an inorganic, non-metallic fluoride catalyst at temperatures ranging below about −20°C., whereby there is obtained a polymer in good yield and purity.

According to the invention, there is provided a process for polymerizing limonene epoxide in the presence of an inert, polar solvent therefor. The overall process involves the utilization of an inorganic, non-metallic fluoride catalyst at a temperature ranging from −20°C. to −150°C., and preferably between −75°C. and −100°C. to obtain a polymer having a molecular weight ranging from about 1000 to about 1900.

In general, any inorganic, non-metallic fluoride catalyst can be employed. Exemplary of the latter are boron trifluoride and phosphorous pentafluoride.

It is a good practice to utilize an inert polar solvent for the terpene oxide to be polymerized. Such includes methylene dichloride, ethyl chloride, propylene chloride, tetrachloroethane, and equivalents thereof. The use of inert polar solvents has been found to be critical. Non-polar solvents, such as benzene, toluene or hexane on the hand, radically reduce the overall yield of resultant polymer.

For a fuller understanding of the invention the following examples are presented which are to be taken merely as illustrative and are not to be deemed as being limitative thereof. The parts are by weight unless otherwise stated.

EXAMPLE 1

Preparation of Poly-limonene Epoxide

To a suitable three-neck, round bottom flask fitted with stirrer, thermometer and gas inlet are added 400 parts of methylene dichloride. To the latter is next added 100 parts of limonene epoxide monomer and resultant mixture is cooled to −78°C. under a stream of dry nitrogen. Gaseous phosphorus pentafluoride, ($PF_5$), catalyst is next introduced into the cold monomeric mixture. The rate of $PF_5$ addition is adjusted so as to maintain the temperature of the polymerizing mixture between −72°C. to −78°C.

Following completion of the phosphorous pentafluoride addition, the reaction mixture is allowed to stir at −78°C. for 10 minutes after which time 50 parts (by volume) of methanol are added to deactivate the phosphorous pentafluoride catalyst. The temperature is allowed to rise to 0°C., whereupon 200 parts (by volume) of 5% aqueous sodium bicarbonate solution are added. The aqueous phase is separated and the organic phase is again washed with bicarbonate solution, followed by washings with water until the washings are neutral.

Resultant polymer solution is next distilled to remove approximately 300 parts (by volume) of methylene chloride. The concentrated polymer solution so obtained is added dropwise to 20 volumes of stirred methanol to effect precipitation of the polymer. The polymer, present as a slurry of white powder, is collected by filtration and dried in vacuo to 70 parts, by weight, corresponding to a yield of 70%.

The molecular weight of the resultant polymer is found to be 1760, indicating the average chain to be formed from 11.5 monomeric units. The melting point of the polymer ranges from about 80°C. to about 95°C. after initial softening at 72°C. The Ring and Ball softening point of the polymer as determined by ASTM E 28–58+ is found to be 100°C.

The polymer is found to be optically active having a $[\alpha]_n^{25} = -23°$ ($CHCl_3$ C = 1); limonene epoxide monomer has a $[\alpha]_n^{25}$ equals +68° ($CHCl_3$ C =1.7), indicating that polymerization proceeds with inversion of optical rotation. The cis epoxide, therefore, had polymerized to a trans polyether structure.

The density of the polymer is determined to be 1.009 g/cc compared to 0.923 for the monomer.

Substituting either hexane or toluene for the methylene dichloride solvent in the procedure of the above example, there is obtained a yield of 7.5% when utilizing hexane and a yield of 1.5% when employing toluene as the solvent.

EXAMPLE 2

This example illustrates the use of polylimonene epoxide as tackifier for rubber.

The polymer of Examples 1 is evaluated as a pressure-sensitive adhesive containing the following composition:

100 parts of a commercially obtained polyisoprene previously milled to a Mooney viscosity of 50.

75 parts of the polymer 1 part of antioxidant.

The formulation is utilized to prepare pressure-sensitive tapes according to conventional procedures. The tapes are then evaluated according to standard test procedures of the Pressure-Sensitive Tape Council (PSTC).

For comparison purposes, a similar formulation is prepared of the homopolymer of limonene.

Results of the test evaluations are presented in the Table I below.

TABLE I

| Polyterpene of: | 180° Shear Adhesion[1] (Min) | Tack[2] | | | 180° Peel Adhesion[3] oz/in | |
|---|---|---|---|---|---|---|
| | | initial | 1 wk. | 2 wks. | initial | 2 wks. |
| Ex. 1 | 1394 | 11+ | 11+ | 11+ | 12.2 | 19.2 |
| Homopolymer of: limonene | 203 | .2 | .2 | .3 | 28 | 33 |

[1]Test method PSTC-2 modified so adhesive metal contact angle is 20°C.
[2]Test method PSTC-18
[3]Test method PSTC-1

I claim:

1. A process for the preparation of a homopolymer which comprises the steps of: contacting monomeric limonene 1,2-mono epoxide dissolved in an inert polar solvent at a temperature ranging between −20°C. and −150°C. in the presence of an inorganic, non-metallic Lewis acid, fluoride catalyst, and thereafter recovering resultant polymer.

2. The process according to claim 1 wherein the inert solvent is methylene dichloride.

3. The process according to claim 1 wherein the inert solvent is ethyl chloride.

4. The process according to claim 1 wherein the inorganic fluoride catalyst is boron trifluoride.

5. The process according to claim 1 wherein the inorganic fluoride catalyst is phosphorus pentafluoride.

6. A homopolymer as prepared by the process of claim 1.

* * * * *